UNITED STATES PATENT OFFICE.

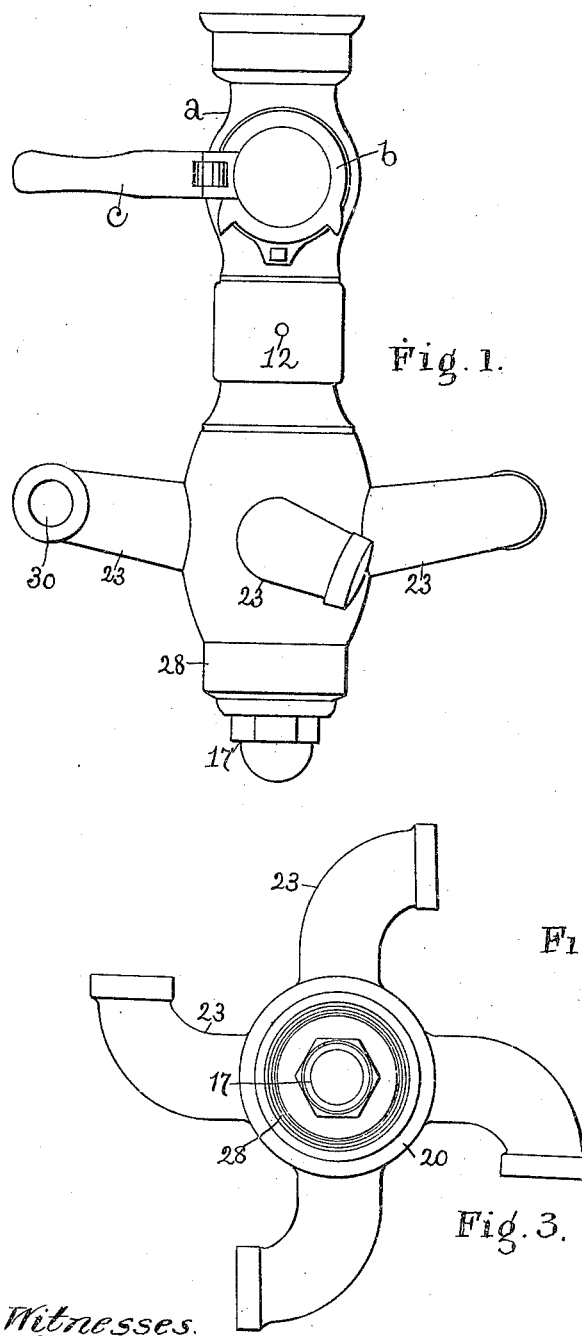

JOSEPH W. KELLEY, OF BROOKLINE, MASSACHUSETTS.

ATTACHMENT FOR HOSE-PIPE NOZZLES.

952,530.

Specification of Letters Patent. Patented Mar. 22, 1910.

Application filed August 3, 1909. Serial No. 511,045.

*To all whom it may concern:*

Be it known that I, JOSEPH W. KELLEY, of Brookline, county of Norfolk, and State of Massachusetts, have invented an Improvement in Attachments for Hose-Pipe Nozzles, of which the following description, in connection with the accompanying drawings, is a specification, like characters on the drawings representing like parts.

This invention relates to a hoze nozzle for use by fire departments, and has for its object to provide a simple and efficient rotary attachment with which streams of water can be distributed over a wide area, which renders the nozzle especially serviceable in fighting fires in cellars, or rooms in which the fire is too hot to permit the firemen to enter.

The invention further has for its object to provide a rotary attachment in which water tight joints are obtained without the use of packing material, and in which provision is made for taking up the wear of the parts.

These and other features of this invention will be pointed out in the claims at the end of this specification.

Figure 1, is an elevation of a fire hose nozzle provided with a rotary attachment embodying this invention. Fig. 2, a longitudinal section on an enlarged scale of the nozzle and its attachment shown in Fig. 1, and Fig. 3, an end view of the nozzle shown in Fig. 1, looking up.

Referring to the drawing *a* represents a fire hose nozzle of any suitable or usual construction, it being provided with a rotary shut off valve *b* having the operating handle *c* and being provided with a threaded end or nipple *d* to which the usual nozzle tip (not shown) is detachably secured.

In accordance with this invention the nozzle *a* has detachably secured to it an attachment which is provided with a rotatable member adapted to discharge the water over a large area. The attachment referred to comprises as herein shown a tube or pipe 10 of the same or substantially the same internal diameter as the nipple *d* of the nozzle *a*, and to the outer side of which is secured as by pins 12 or otherwise a sleeve 13, which is extended beyond one end of the tube or pipe 10 and is internally threaded to engage the threaded nipple *d*. The tube or pipe 10 is closed at its other end by a plug 15 having a threaded end or projection 16 which is engaged by a nut 17. The tube or pipe 10 intermediate its ends is provided with ports or openings 18, which communicate with an annular chamber 19 formed by a barrel or rotatable member 20, which in accordance with this invention is provided at its ends with inturned flanges 21—22 and intermediate its ends with this invention is provided at its ends with laterally extended distributing hollow arms 23. The flange 21 is provided with a concaved outer surface 24, which coöperates with the convexed outer surface 25 of the sleeve 13, the surface 25 forming a stationary seat for the barrel, and the flange 22 is provided with a convexed outer surface 26 which engages the concaved surface 27 of a collar or ring 28, loose on the tube or pipe 10 and engaged by a flange on the nut 17. The outer surfaces of the flanges 21—22 and the coöperating surfaces of the sleeve 13 and collar 28, are ground to form water tight joints without the use of packing, and by means of the nut 17, being turned up against the collar 28, said surfaces can be kept in close contact to take up wear, the said collar and barrel being moved longitudinally on the pipe until the barrel engages the stationary seat 25. The friction between the barrel 20 and its coöperating surfaces can be increased or decreased by means of the nut 17, so as to adjust the barrel to the force or pressure of the water. The distributing arms 23 are provided with outlets or openings 30, at their ends, and may be arranged so as to discharge the water in different planes or in the same plane.

In operation, the attachment herein shown is especially useful for fighting fires in cellars, or rooms where the fire is so hot as to render it practically impossible to fight the fire in the ordinary manner, for in such cases, it is only necessary to cut a hole in the floor above sufficiently large to permit the nozzle to be lowered into the cellar or other room a distance sufficient to permit the rotatable member to revolve, whereupon, the water will be distributed over a large area by the distributing arms 23, which may be revolved at such a rapid rate as to form a sheet, layer, or blanket of water in the cellar or room, thereby most effectively discharging the water onto the fire.

By providing a ground joint fit between the barrel or rotatable member 20 and the coöperating seat 25 and collar 28, a water tight joint is obtained without the use of packing and the attachment is maintained in effective working condition without attention for a substantially long time, and if the joints should in time, become worn, they can be again quickly and easily rendered tight by turning up the nut 17.

Claims:

1. An attachment for hose pipe nozzles comprising a tube having intermediate its ends a port, a sleeve attached to said tube at one end and provided with screw-threads for engagement with the nozzle proper, and having at its other end a seat, a plug closing the other end of the said tube and provided with a threaded projection, a rotatable barrel mounted on said tube and provided intermediate its ends with a water outlet and at its ends with inturned flanges, one of which coöperates with said seat to form a water-tight joint, a collar loose on said tube and coöperating with the other of said flanges to form a water-tight joint, and a nut to engage said threaded projection and said collar, substantially as described.

2. An attachment for hose pipe nozzles comprising a tube open at one end and provided intermediate said ends with a port, a rotatable barrel provided at its ends with inturned flanges and mounted on said tube to revolve thereon intermediate its ends and provided with a water outlet intermediate the ends of the barrel, a stationary seat on said tube with which one of said flanges co-operates to form a fluid-tight joint, a collar loose on said tube to slide thereon and coöperating with the other of said flanges to form a fluid-tight joint intermediate the ends of the tube, and means coöperating with said collar to retain the latter on said tube, substantially as described.

3. An attachment for hose pipe nozzles comprising a tube provided intermediate its ends with a port, a rotatable barrel loose on said tube to revolve thereon and provided at its ends with curved surfaces and intermediate its ends with a water outlet, a stationary seat on said tube having a curved outer surface with which the curved surface on one end of said barrel coöperates to form a ground joint, a collar on said tube having a curved surface coöperating with the curved surface of the opposite end of said barrel to form a ground joint therewith intermediate the ends of the tube and to move the barrel toward the stationary seat, and means to retain said collar on said tube, substantially as described.

In testimony whereof, I have signed my name to this specification in the presence of two subscribing witnesses.

JOSEPH W. KELLEY.

Witnesses:
 ERNEST LYON,
 EDWARD A. McETTRICK.